Jan. 13, 1931.  E. O. SCHJOLIN  1,788,894
GEAR SHIFTER MECHANISM
Filed Oct. 25, 1929   2 Sheets-Sheet 1

Inventor
Eric Olie Schjolin
By Blackmore, Spencer & Tieth
Attorneys

Jan. 13, 1931.  E. O. SCHJOLIN  1,788,894
GEAR SHIFTER MECHANISM
Filed Oct. 25, 1929  2 Sheets-Sheet 2
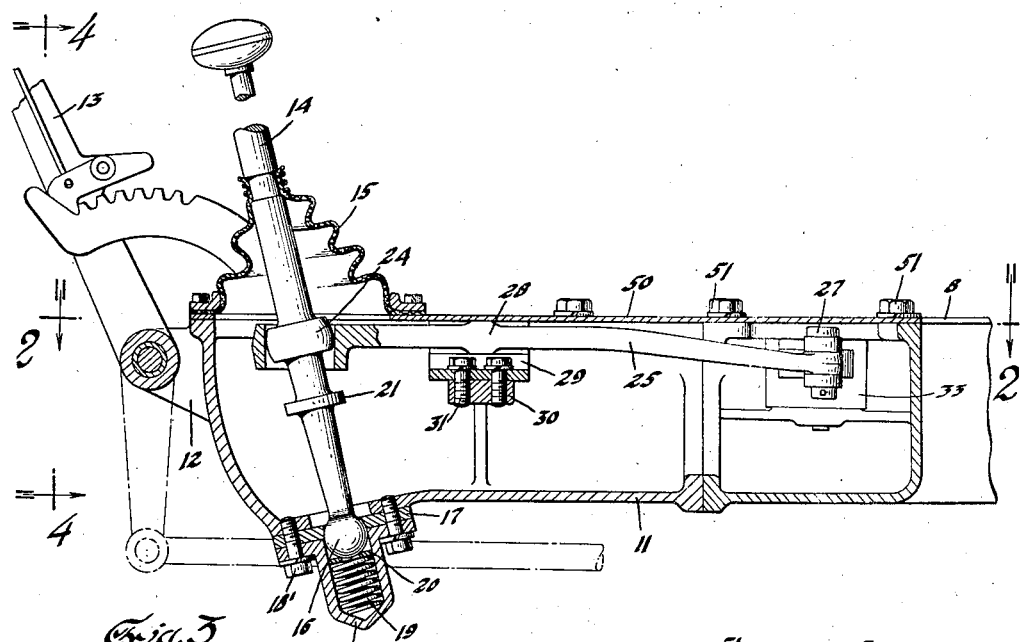
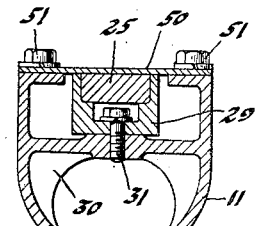
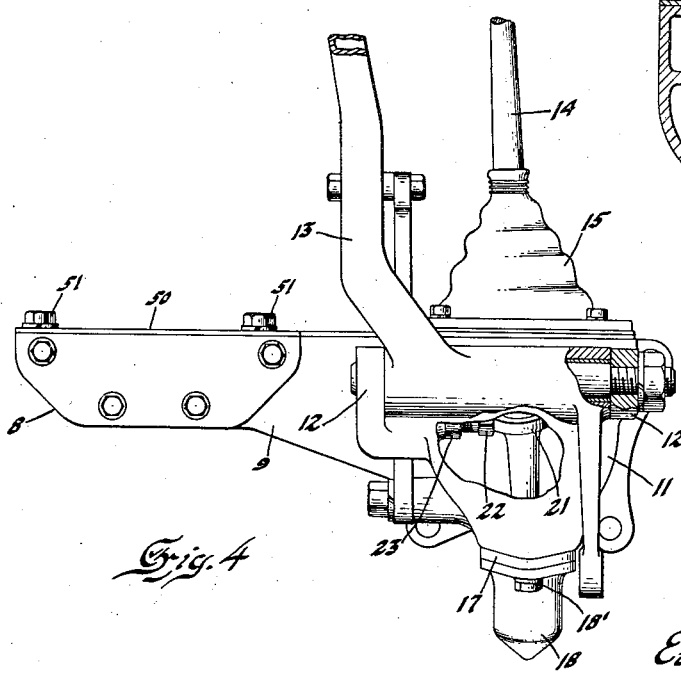
Inventor
Eric Olie Schjolin
By Blackmore, Spencer & Keith
Attorneys Patented Jan. 13, 1931

1,788,894

UNITED STATES PATENT OFFICE

ERIC OLIE SCHJOLIN, OF PONTIAC, MICHIGAN, ASSIGNOR TO YELLOW TRUCK & COACH MANUFACTURING COMPANY, OF PONTIAC, MICHIGAN, A CORPORATION OF MAINE

GEAR-SHIFTER MECHANISM

Application filed October 25, 1929. Serial No. 402,471.

This invention relates to control devices and particularly to an improvement in remote control mechanism for operating parts of a motor vehicle or the like. It is especially adapted for embodiment in passenger coaches and busses wherein power from the engine mounted in the forward portion of the vehicle is transmitted to driving wheels at the rear through suitable clutch and change speed gearing. Ordinarily in this class of vehicles the propeller shaft between the engine and rear axle differential extends on approximately the longitudinal center line of the chassis and since in the conventional transmission mechanism the gear shift lever projects upwardly from the immediate vicinity of the gearing, the location of the driver's seat and other control devices is definitely determined by the location of the gear shift lever. Obviously this limitation is sometimes objectionable, particularly where it is desired to employ large and wide bodies, and it is one of the primary objects of the present invention to overcome the disadvantage of this type of drive without destroying its advantages.

It is a further object of the invention to provide remote control mechanism for the transmission gearing which will permit the operator's seat and associated control devices to be arbitrarily moved both forwardly and laterally of the gear set and positioned as compactly as possible in a corner space of the body to afford clear vision to the driver and a maximum unobstructed loading space on the platform adjacent the entrance door.

Another object of the invention is to provide improved actuating means for effecting engagement and disengagement of the transmission gearing from the driver's remote position together with a protective enclosure and support for the movable parts which includes a removable cover plate that normally lies flush with and forms a part of the car floor, and is easily removed to facilitate accessibility, inspection and repair of the parts.

Other objects and features of advantage will become apparent during the course of the following specification when taken in connection with the accompanying drawings which illustrate a preferred, but, not necessarily, the only embodiment of the invention.

In the drawings:

Fig. 3 is a vertical sectional view taken on line 3—3 of Fig. 1.

Fig. 4 is a front elevation looking in the direction of the arrows on line 4—4 of Fig. 3, having parts broken away and shown in section.

Fig. 5 is a transverse sectional view taken on line 5—5 of Fig. 2.

Figure 1:
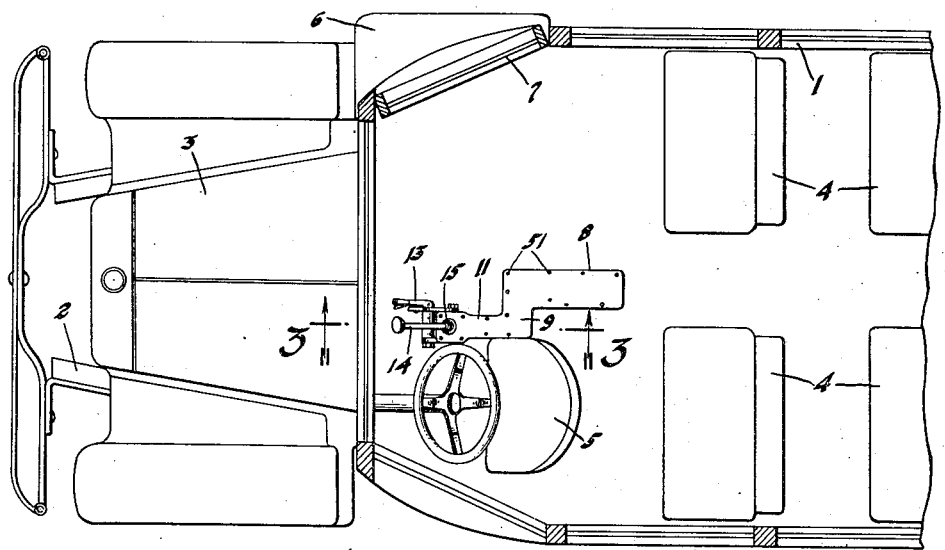
Fig. 1 is a horizontal sectional view of a portion of a vehicle body illustrating the application of the invention thereto.
Figure 2:
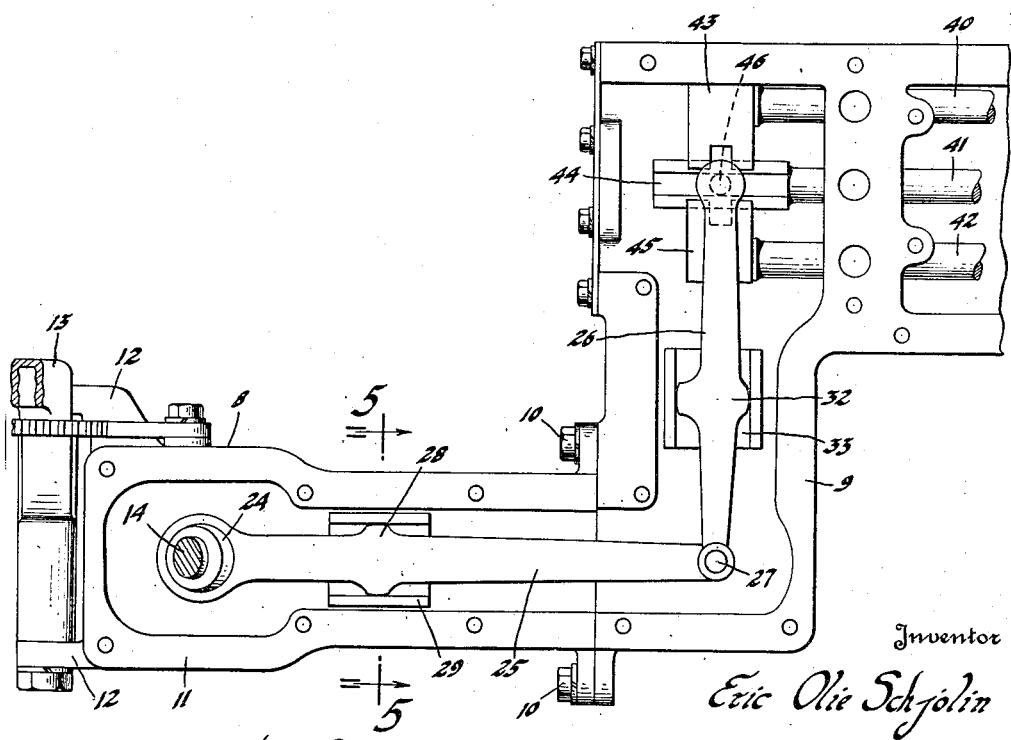
Fig. 2 is a top plan view of the operating mechanism with the cover plate removed and may be considered as looking in the direction of the arrows on line 2—2 of Fig. 3.

Referring specifically to the drawing, the reference character 1 indicates a passenger body of a motor vehicle which is mounted upon a chassis frame 2 directly behind the power plant or engine inclosed beneath the conventional bonnet or hood 3. A number of passenger seats 4 are shown as being mounted on the floor to the rear of a driver's seat 5 in the forward corner of the body and to one side of the loading platform to which leads a step 6 and entrance door 7 in the side wall of the body.

To the side and rear of the driver's seat 5 and on approximately the center line of the vehicle is shown a gear box or housing 8 for the change speed mechanism. This housing 8 is shown as being provided with a lateral hollow extension 9 to which is secured by bolts 10 a forward hollow projection 11. If desired, the housing members 9 and 11 may be formed integral with the casing 8 or each may be separate parts fastened together. Integral with the forward portion of the hollow projection or housing member 11 are a pair of spaced ears 12—12 between which is pivotally mounted the upwardly extending hand lever 13 for operating the service brake of the vehicle. Directly beside the brake lever 13 and adjacent the driver's seat 5 is a gear shift lever or cane 14 which projects through an opening preferably closed by a flexible boot or cover 15, and which is universally mounted in the housing member 11 for to and fro and sidewise movements. The universal mounting for the cane 14 preferably involves the formation of a ball 16 on the lower end of the cane which has a bearing against the plate 17 secured to the underside of the housing 11 by a series of bolts 18' which also serve to fasten the dome member 18 inclosing a coil spring 19 that exerts its tension upwardly against a plate or washer 20 contacting with the ball 16 to hold the ball in contact with the bearing plate 17. Spaced above the ball end 16 is shown an abutment ring or collar 21 preferably formed as an integral part of the cane 14, and which is adapted to engage with a stop shown in the present case as consisting of a set screw 22 threaded into the side wall of the casing 11 and provided with a lock nut 23 to hold it in adjusted position to limit the swinging movement of the cane 14 in one direction for a purpose to be hereafter referred to.

Also formed on the cane or shift lever 14 is an enlargement or ball member 24 which is located in an eye or opening formed at the end of one of a pair of angularly disposed levers or bars 25 and 26 respectively. The adjacent ends of the levers 25 and 26 are pivotally connected as by means of a pin or stud 27 projecting through the forked end of one lever and the end of the other lever received between the forks.

Both levers are mounted in the housing extensions for both sliding or shifting movement in the direction of their longitudinal extent, and rocking or swinging movement about a vertical axis or one extending at right angles to the longitudinal extent of the bars. For so mounting the bar or lever 25 there may be provided intermediate the ends of the bar an enlargement 28 to afford a pair of arcuate bosses on opposite sides thereof that fulcrum on the vertical sides of a U-shaped bearing member or block 29, the bottom of the block forming a sliding contact surface for the lever. This bearing block is preferably made of hardened steel or other suitable material and is replaceably secured to a wall or web 30 of the housing member 11 as by means of screws or studs 31 having their heads countersunk or positioned in a depression in the bottom portion of the bearing block. The lever 26 may be similarly supported in the housing member 9, by providing it with an intermediate enlargement 32 for engagement with a U-shaped block 33. Thus the two levers 25 and 26 are mounted for both rocking and swinging movement, the rocking movement of the lever 25, when the shift lever or cane 14 is moved sidewise, being transmitted through the pivotal connection 27 to slide or shift the lever 26, and the sliding or shifting movement of the lever 25 when the cane 14 is rocked to and fro, resulting in a rocking or swinging movement of the lever 26, which inversely related movements, when properly executed, bring predetermined gears of the transmission mechanism into driving engagement with each other.

The lever 26 may be connected with the particular type of shift mechanism to be used according to anyone of a number of ways. In the drawing there are shown three shifter rods, 40, 41 and 42, forming part of a so-called four-speed transmission which includes four speeds forward and one reverse. For example, the rod 40 may control first and second speeds, rod 41 the third and fourth speeds, and rod 42 the reverse speed. The drawing shows heads 43, 44 and 45 on the ends of rods 40, 41 and 42, respectively, each provided with a notch or groove, arranged for alignment with each other when all the gears are out of mesh and the shift lever 14 is in neutral position. A dependent pin or stud 46 carried by the free end of the lever 26 extends into one or the other of the three notches at all times. To bring about gear engagement, or to go from one speed to another, it is necessary that the stud 46 be first brought into the notch in the head on the particular shifter rod that controls the desired speed gearing, and to thereafter manipulate the levers to shift the rod selected.

As a precaution against the accidental engagement of the reverse gearing, the abutment 21 and stop 22, before referred to, is provided to limit the sidewise movement of the cane 14 and the movement of the stud 46 into the notch of the reverse selector rod 42. When the operator desires to go into reverse, it is necessary for him to depress the cane 14 against the tension of the coil spring 19 until the collar 21 is moved below the head 22 after which the cane may be moved sidewise and then fore or aft as the case may be to effect the proper engagement of the reverse gearing.

In order to facilitate assembly and also the replacement of parts, the top of the housing member consists of one or more removable cover plates, such as 50, secured in position by the fastening bolts 51. Detachment of the bolts 51 may be easily effected from inside the car, to permit removal of the cover plate, and thereafter all the operating parts are readily accessible. The lever members can be simply lifted out of their supporting bearings which also permits access to the bearing attachment studs in the event replacements become necessary. Since the top of the transmission housing lies flush with the car floor, the arrangement described affords a maximum of unobstructed platform space which facilitates loading and eliminates delay at loading stations.

While the above description has been more or less specific as to detail structure, it will be understood that the invention is not so limited and that various modifications may be readily made such as come within the scope of appended claims.

I claim:

1. Remote control mechanism for change speed gearing of a motor vehicle having shifter rods, including a pair of angularly disposed levers extending in a substantially horizontal plane beneath the floor of the vehicle body, each of the levers being shiftable in the direction of its longitudinal axis and rockable about an axis at right angles to its longitudinal axis, and a pivotal connection between adjacent portions of the levers, whereby the rocking movement of one lever shifts the other into engagement with a shifter rod and the shifting movement of the first lever rocks the other to shift the shifter rod selected by the first movement.

2. Remote control mechanism for change speed gearing of a motor vehicle, including a pair of angularly disposed levers extending in a substantially horizontal plane, each lever being shiftable in the direction of its longitudinal axis and rockable about an axis at right angles to its longitudinal axis and means connecting the levers, whereby the movements of one lever are transmitted to the other, the respective rocking and shifting movements of one lever causing a corresponding shifting or rocking movement of the other lever.

3. Remote control mechanism for change speed gearing of a motor vehicle, including a pair of angularly disposed levers, a pair of arcuate bosses on opposite sides of each lever intermediate its ends, sliding contact bearings for said bosses which permit both the rocking and sliding movement of the levers, and a connection between adjacent portions of the levers, whereby when one lever is rocked, the other is slid and vice-versa.

4. Remote control mechanism for change speed gearing of a motor vehicle, including a pair of angularly disposed levers, fulcrum portions on opposite sides of each lever intermediate its length, bearing members for said levers, each comprising a bottom on which a lever rests and has sliding contact and sides on which said fulcrum portions have bearings, and a connection between said levers to transmit movement from one to the other, the rocking motion of one lever resulting in a sliding movement of the other and vice versa.

5. Remote control mechanism for change speed gearing, including a pair of rockable and slidable levers disposed angularly to one another, a curved surface enlargement on each lever, bearing surfaces for the engagement of said enlargements, and about which the levers are rockable, and other bearing surfaces on which the levers are supported for sliding movement, and a connection between the levers for transmitting movement between the levers to rock and slide one lever in inverse relation to the rocking and sliding motion of the other.

6. Remote control mechanism for change speed gearing of a motor vehicle, including a rockable and slidable lever having integral arcuate bosses on opposite sides intermediate its ends, and a bearing element comprising a bottom portion on which the lever rests and has sliding contact and side portions on which said bosses fulcrum during rocking movement of the lever.

7. Remote control mechanism for change speed gearing, including a horizontally disposed motion transmitting member that is slidable in the direction of its longitudinal extent and rockable about a vertical axis, a vertically disposed hand lever universally mounted at its lower end for to and fro and sidewise movement and having a ball portion intermediate its length positioned in an opening in said member to move the same and slidable therein in the direction of its length an abutment on the lever, a stop engageable with said abutment to limit lever movement in one direction, and a resilient element associated with the universal mounting of the lever which yields when the lever is depressed to move the abutment clear of said stop.

8. In a motor vehicle wherein change speed mechanism is located on substantially the longitudinal center line of the chassis frame and the operator's seat is offset forwardly and laterally therefrom, a housing for the gear mechanism, a lateral hollow projection on said housing, a forward hollow extension cooperating with said projection, a cane universally mounted in said projection and extending upwardly beside the driver's seat, and a pair of angularly disposed levers enclosed in said projection and extension and mounted for rocking and sliding movement, one of the levers being connected with the cane and the other with the change speed mechanism and a connection between the two levers, whereby the movement of the cane rocks and swings the levers in inverse relation and concomitantly to control the change speed mechanism.

9. In a motor vehicle, a chassis frame, a body mounted thereon, driving controls in the body offset laterally from the longitudinal center line of the chassis, a housing for operating mechanism offset laterally and longitudinally from said controls, a lateral extension on said housing, a longitudinal projection on said extension leading to the controls and motion transmitting connections between the controls and operating mechanism enclosed within said projection and extension.

In testimony whereof I affix my signature.

ERIC OLIE SCHJOLIN.